(12) United States Patent
Collura

(10) Patent No.: US 11,698,019 B2
(45) Date of Patent: Jul. 11, 2023

(54) EXHAUST GAS AFTERTREATMENT SYSTEM

(71) Applicant: Liebherr-Components Colmar SAS, Colmar (FR)

(72) Inventor: Salvatore Collura, Luttenbach (FR)

(73) Assignee: Liebherr-Components Colmar SAS, Colmar (FR)

( * ) Notice: Subject to any disclaimer, the term of this patent is extended or adjusted under 35 U.S.C. 154(b) by 0 days.

(21) Appl. No.: 17/242,143

(22) Filed: Apr. 27, 2021

(65) Prior Publication Data

US 2021/0332735 A1    Oct. 28, 2021

(30) Foreign Application Priority Data

Apr. 28, 2020  (DE) .................. 10 2020 111 566.0

(51) Int. Cl.
| | | |
|---|---|---|
| *F01N 13/00* | (2010.01) | |
| *B01D 53/94* | (2006.01) | |
| *F01N 3/20* | (2006.01) | |
| *F01N 3/28* | (2006.01) | |

(52) U.S. Cl.
CPC .......... *F01N 13/011* (2014.06); *B01D 53/944* (2013.01); *B01D 53/9431* (2013.01); *B01D 53/9495* (2013.01); *F01N 3/2013* (2013.01); *F01N 3/2066* (2013.01); *F01N 3/2892* (2013.01); *B01D 2255/9045* (2013.01); *F01N 2610/02* (2013.01)

(58) Field of Classification Search
CPC .... F01N 13/011; F01N 3/2013; F01N 3/2066; F01N 3/2892; F01N 2610/02; B01D 53/9431; B01D 53/944; B01D 53/9495; B01D 2255/9045

USPC ............................................. 60/300
See application file for complete search history.

(56) References Cited

U.S. PATENT DOCUMENTS

| | | | |
|---|---|---|---|
| 5,377,486 A | 1/1995 | Servati et al. | |
| 6,739,579 B1 | 5/2004 | Rim | |
| 6,820,417 B2 * | 11/2004 | May .................... | F01N 13/0097 60/297 |
| 7,040,451 B2 | 5/2006 | Schumacher et al. | |
| 7,421,839 B2 * | 9/2008 | Igarashi ................ | F01N 3/0222 60/274 |

(Continued)

FOREIGN PATENT DOCUMENTS

| | | |
|---|---|---|
| AT | 515899 A1 | 12/2015 |
| DE | 102008017279 A1 | 10/2009 |

(Continued)

OTHER PUBLICATIONS

European Patent Office, Extended European Search Report Issued in Application No. 21169713.1, dated Jul. 26, 2021, Germany, 6 pages.

*Primary Examiner* — Devon C Kramer
*Assistant Examiner* — Kelsey L Stanek
(74) *Attorney, Agent, or Firm* — McCoy Russell LLP

(57) ABSTRACT

The present invention shows an exhaust gas aftertreatment system comprising at least a first route and a second route arranged in parallel in an exhaust gas stream, wherein the first route and the second route are provided with exhaust gas aftertreatment subsystems. The exhaust gas aftertreatment subsystems of the first route and the second route use different exhaust gas aftertreatment technologies.

22 Claims, 3 Drawing Sheets

(56) References Cited

U.S. PATENT DOCUMENTS

| | | | |
|---|---|---|---|
| 2004/0112046 A1* | 6/2004 | Tumati | F01N 13/009 60/297 |
| 2004/0144084 A1* | 7/2004 | Hara | B60H 1/025 60/288 |
| 2010/0037607 A1* | 2/2010 | Doring | F02B 37/164 60/287 |
| 2014/0010744 A1* | 1/2014 | Ruona | F01N 3/208 422/105 |
| 2014/0314646 A1* | 10/2014 | Eckhoff | B01D 53/9495 423/212 |
| 2015/0285174 A1 | 10/2015 | Scott | |
| 2015/0361843 A1 | 12/2015 | Hillen et al. | |
| 2017/0218818 A1* | 8/2017 | Schimik | F01N 3/035 |
| 2018/0135481 A1 | 5/2018 | Phillips | |
| 2018/0156100 A1* | 6/2018 | Klingbeil | F01N 9/00 |
| 2020/0369259 A1* | 11/2020 | Huq | B60W 10/06 |

FOREIGN PATENT DOCUMENTS

| | | | | |
|---|---|---|---|---|
| DE | 102015013864 A1 * | 5/2017 | | F01N 3/106 |
| DE | 102015013864 A1 | 5/2017 | | |
| DE | 102016001197 B3 | 7/2017 | | |
| DE | 102017116578 A1 | 1/2018 | | |
| DE | 102018101665 A1 | 7/2019 | | |
| EP | 2216523 A1 | 8/2010 | | |
| EP | 3110531 B1 | 5/2019 | | |

* cited by examiner

EXHAUST GAS AFTERTREATMENT SYSTEM

CROSS REFERENCE TO RELATED APPLICATION

The present application claims priority to German Patent Application No. 10 2020 111 566.0 filed on Apr. 28, 2020. The entire contents of the above-listed application is hereby incorporated by reference for all purposes.

TECHNICAL FIELD

The present invention is directed to an exhaust gas aftertreatment system comprising at least a first route and a second route arranged in parallel in an exhaust gas stream, wherein the first route and the second route are provided with exhaust gas aftertreatment subsystems.

BACKGROUND AND SUMMARY

Such a system is known from U.S. 2018/0156100 A1, where a second route comprising a smaller aftertreatment subsystem is used at idle and during cold start to avoid catalyst poisoning due to oil emissions.

Exhaust valves have also been used for exhaust thermal (U.S. Pat. No. 6,739,579 B1) and noise management (U.S. Pat. No. 7,040,451 B2), some have also proposed to use valves to actively modify the exhaust after treatment geometry using a light off catalyst (U.S. Pat. No. 5,377,486 A) or catalysts operating at different temperature windows (U.S. Pat. No. 6,820,417 B2).

U.S. 2015/285174 A1 uses the grid box to increase the engine load at idle. EP 3 110 531 B1 shows a method where an exhaust throttle is closed to increase the exhaust temperature to periodically remove adsorbed HCs in a SCR catalyst.

Because it is very difficult to determine the amount of accumulated HC on the SCR catalyst and to control the solid temperature of the substrate, these regeneration events can lead to catalyst mechanical and thermal damage.

The object of the present invention is therefore to provide an improved exhaust gas aftertreatment system.

This object is solved by an exhaust gas aftertreatment system according to claim 1. Preferred embodiments of the present invention are the subject matter of the dependent claims.

The present invention shows an exhaust gas aftertreatment system comprising at least a first route and a second route arranged in parallel in the exhaust gas stream, wherein the first route and the second route are provided with exhaust gas aftertreatment subsystems, wherein the exhaust gas aftertreatment subsystems of the first route and the second route use different exhaust gas aftertreatment technologies.

In particular, the exhaust gas aftertreatment subsystem of one of the routes uses an exhaust gas aftertreatment technology not used in the exhaust gas aftertreatment subsystem of the other route.

In a preferred embodiment, the exhaust gas aftertreatment subsystem of the first route uses a first exhaust gas aftertreatment technology not used in the exhaust gas aftertreatment subsystem of the second route and/or the exhaust gas aftertreatment subsystem of the second route uses a second exhaust gas aftertreatment technology not used in the exhaust gas aftertreatment subsystem of the first route.

According to the terminology used in the present invention, exhaust gas aftertreatment technologies are only different if they are based on a different chemical and/or physical principle, not already if they use different catalyst materials. Exhaust gas aftertreatment subsystem using the same exhaust gas aftertreatment technology may still use different catalyst materials.

Examples of different exhaust gas aftertreatment technologies according to the present invention are SCR catalysts, diesel oxidation catalysts, NOx storage catalysts, and particulate filters.

The present invention is based on the realization of the inventors of the present invention that different operation phases of the engine do not only require catalysts of different sizes or operating temperatures, but that different operation phases have requirements that can better be met using different exhaust gas aftertreatment technologies.

In an embodiment of the present invention, the first route is provided with a SCR catalyst. The SCR catalyst preferably uses reductant injection, in particular urea injection. Urea injection in particular may include injecting a urea precursor into the exhaust gas stream. The reductant injected in front of the SCR could also be ammonia gas or liquid or any precursor of ammonia such as ammonium salts.

In an embodiment of the present invention, the second route is provided with a diesel oxidation catalyst. The diesel oxidation catalyst is preferably electrically heated.

In an embodiment of the present invention, the first route is not provided with a diesel oxidation catalyst.

In an embodiment of the present invention, the second route is not provided with a SCR catalyst.

The embodiments discussed above will prevent damage to catalysts due to adsorbed HC oxidation during certain operation conditions such as idling periods or when the exhaust gas temperatures are too low to properly oxidize the HC.

For example, some vehicles have idling phases where the low exhaust temperatures are favorable to HC adsorption. The longer the idling phases, the higher the amount of adsorbed HC on the catalysts. The oxidation of these stored HC can lead to high temperatures that can damage the catalysts.

Use of the different aftertreatment technologies for the first and second route may avoid having stored HC and thus avoid having damage to the catalysts.

Selective Catalytic Reduction (SCR) Exhaust Aftertreatment System (EATS) is a key technology for reducing NOx emissions from internal combustion engines. Amongst SCR catalysts, there are mainly three different materials available in large scale production: vanadium, copper zeolite and iron zeolite based catalysts. At low temperature, those catalysts tend to adsorb HC emissions from exhaust gases. HC adsorption can be detrimental to the catalyst performance by either forming coke and plugging the catalyst or breaking the catalyst substrate when the adsorbed HC are oxidized as soon as the temperature is increased.

In an embodiment, the present invention will avoid HC adsorption on the SCR catalysts by bypassing it during certain operation condition such as at low temperature, e.g. when the engine is running at idle. In an embodiment, invention not only proposes to bypass the SCR catalyst, but also to reduce most of the HC emissions when the SCR catalyst is bypassed.

Bypassing the SCR system could also be used during motoring time to avoid the SCR catalyst cooling.

In an embodiment of the present invention, a piping of the first route has a larger sectional area than a piping of the second route, wherein the sectional area of the piping of the second route is preferably between 10% to 30% of the sectional area of the piping of the first route. The size of the tubing takes into account the different exhaust gas flows during the operating conditions where the first and the second route may be used.

In an embodiment of the present invention, a volume of the exhaust gas aftertreatment subsystem of the first route and/or of a catalyst of the exhaust gas aftertreatment subsystem of the first route is bigger than a volume the exhaust gas after-treatment subsystem of and the second route and/or of a catalyst of the exhaust gas aftertreatment subsystem of the second route.

Preferably, the volume the exhaust gas aftertreatment subsystem of the second route and/or of a catalyst of the exhaust gas aftertreatment subsystem of the second route is preferably between 5% to 15% of the volume of the exhaust gas aftertreatment subsystem of the first route and/or of a catalyst of the exhaust gas aftertreatment subsystem of the first route.

The size of the exhaust gas aftertreatment subsystems and/or catalysts takes into account the different exhaust gas flows during the operating conditions where the first and the second route may be used.

In an embodiment of the present invention, the exhaust gas aftertreatment system comprises at least one valve and/or flap for controlling an exhaust gas stream through the first or the second route.

In an embodiment of the present invention, the first route is provided with a first valve and/or flap and the second route is provided with a second valve and/or flap, the first and the second valve and/or flap operable to selectively open and close the respective route.

In an embodiment of the present invention, the first valve and/or flap is a naturally open valve and/or flap and/or wherein the second valve and/or flap is a naturally closed valve and/or flap. Therefore, if the actuators for operating the first valve and/or flap and the second valve and/or flap fail, the exhaust gas aftertreatment system will still be able to operate with the first route open and the second route closed.

In an embodiment of the present invention, the at least one valve and/or flap is arranged downstream of the of the exhaust gas aftertreatment subsystem of the first route and/or of the second route. Thereby, the at least one valve and/or flap does not have to operate under the high temperature conditions upstream of the exhaust gas aftertreatment subsystems of the first route and/or of the second route.

In an embodiment of the present invention, the second route bypasses a turbocharger arranged in the exhaust gas stream. This takes into account that during the operation conditions where the second route is used, no charging is necessary or possible.

In an embodiment of the present invention, the exhaust gas aftertreatment system comprises a plurality of first routes, each provided with an exhaust gas aftertreament subsystem and arranged in parallel in the exhaust gas stream.

In an embodiment, each first route is provided with a valve and/or flap.

In an embodiment, the plurality of first routes is combined with a single second route.

In case that multiple first and/or second routes are used, the above described preferred sizes for the tubing and the exhaust gas aftertreatment subsystems and/or catalysts preferably refers to the sum of the sizes of all the first routes and all the second routes, respectively.

In an embodiment of the present invention, the exhaust gas aftertreatment system comprises a controller to selectively control exhaust gas flow through the first and/or second route, the controller configured to direct the exhaust gas flow through the first route during a first engine operation condition and to direct the exhaust gas flow through the second route during a second engine operation condition.

In an embodiment of the present invention, in the first engine operation condition, a load and/or exhaust gas temperature of the engine is higher than in the second engine operation condition.

In an embodiment of the present invention, the second engine operation condition comprises an idle operation state of the engine.

The present invention further comprises an engine comprising an exhaust gas aftertreatment system as described above. The engine may in particular be a Diesel engine.

The present invention further comprises a machine comprising an engine as described above.

In an embodiment of the present invention, the machine is a mobile working machine. In particular, the engine may be used as a drive for the propulsion of the mobile working machine and/or for operating working equipment of the machine.

In an embodiment of the present invention, the mobile working machine is configured to be operated electrically during at least one operation phase, for example during a trolley phase, and the engine is running in idle mode during this operation phase.

In an embodiment of the present invention, the mobile working machine does not have a grid box that could be used to increase the engine load at idle.

In possible embodiments, the machine may be a mining and/or construction mobile machine, an electric generator or a ship.

The present invention is now described in more detail with respect to specific embodiments and drawings.

DETAILED DESCRIPTION

Figure 1:
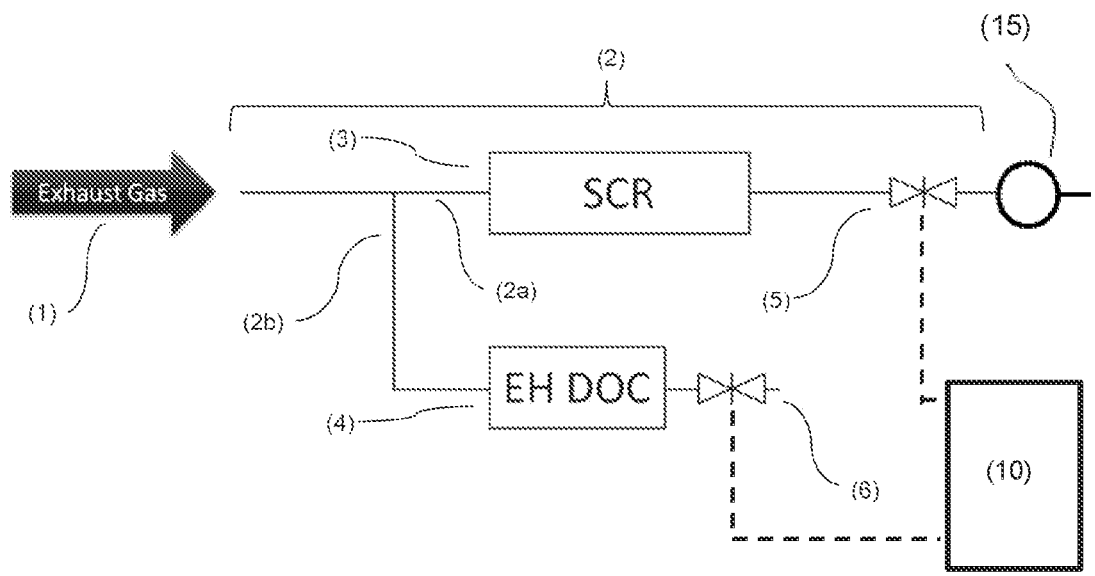
FIG. 1 shows a first embodiment according to the present invention.

The embodiment of the present invention shown in FIG. 1 shows an exhaust gas aftertreatment system (2) comprising at least a first route (2a) and a second route (2b) arranged in parallel in the exhaust gas stream.

The first route (2a) is provided with a first aftertreatment subsystem (3) and the second route (2b) with a second exhaust gas aftertreatment subsystem (4). The first exhaust gas aftertreatment subsystem (3) of the first route (2a) and the second exhaust gas aftertreatment subsystem (4) of the second route (2b) use different exhaust gas aftertreatment technologies.

Further, flaps and/or valves (5, 6) are provided to selectively direct the exhaust gas stream through the first route (2a) and the second route (2b). The flaps and/or valves (5, 6) are controlled by a controller (10). The controller may comprise a microprocessor and code stored in memory for controlling the flaps and/or valves (5, 6). The controller may further be connected to sensors or receive inputs from an engine controller.

In the embodiment, the first aftertreatment subsystem (3) is an SCR catalyst, and the second aftertreatment subsystem (4) is a Diesel oxidation catalyst. The SCR catalyst may in particular be a Vanadium based SCR. The details described with respect to the embodiments can however also be used with other types of catalysts.

The present invention aims at diverting the exhaust gas away from the SCR catalyst (3) when the engine is running at idle by closing one or several valves and opening one valve. The goal is to avoid having hydrocarbons (HC) emitted from the engine to be adsorbed on the SCR catalyst (3) and damaged it by either coking or thermal decomposition leading to the substrate damage. Further, in the embodiment, a heater or a heated catalyst (4) is used when the main aftertreatment subsystem comprising a SCR catalyst (3) is bypassed.

Figure 6:
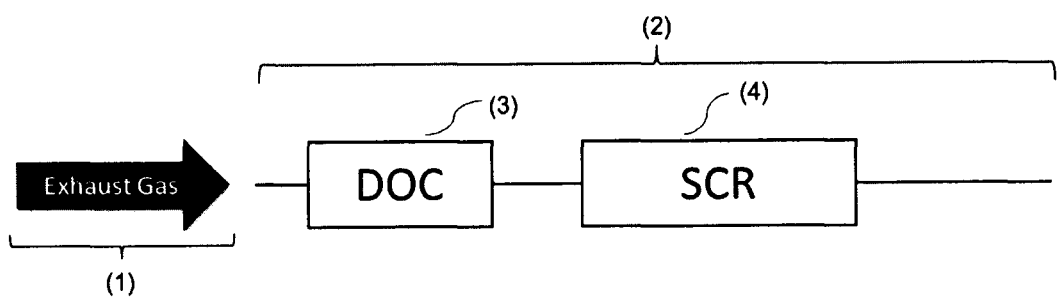
FIG. 6 shows a prior art exhaust gas aftertreatment system.

In standard exhaust systems such as shown in FIG. 6 the diesel oxidation catalyst (DOC) is mounted upstream of the SCR system. In such a configuration, the DOC has to be large enough to avoid having high pressure drop at engine full load. In such a layout, the large DOC is very expensive because of the material and the precious metal needed to manufacture it.

The invention represented on the FIG. 1 is designed to treat the exhaust gases (1) from an internal combustion engine using a modular exhaust gas aftertreatment system (2). The modular exhaust gas aftertreatment system (2) comprises two exhaust routes:

A main route (2a) with large diameter piping which is optimized to have a low exhaust pressure drop for all the engine operating conditions. This exhaust piping is composed of an SCR system (3) which aims at reducing the NOx emissions using an ammonia precursor injecting in front of a SCR catalyst and/or filter. It may further have an ammonia clean up catalyst. Further, an exhaust valve/flap (5) is provided;

A secondary route (2b) with lower pipe diameter than the main route (2b) piping. The exhaust piping is designed for low engine load operation, hence low exhaust volume flow. On this piping is fitted an electrically heated diesel oxidation catalyst (4) and an exhaust valve/flap (6). The electrical heater can be either part of the diesel oxidation substrate or mounted in front of the diesel oxidation catalyst.

The exhaust valves/flaps can be either mounted downstream or upstream of the SCR catalyst (3) and the diesel oxidation catalyst (4). However, due to possible exhaust leakage and/or high temperature, the preferred location is downstream of the SCR catalyst (3) and the diesel oxidation catalyst (4).

The valve/flap (5) located downstream the SCR system (3) would be preferably a naturally open valve/flap and the valve/flap (6) located downstream the DOC (4) would be preferably a naturally closed valve/flap in order to still be able to use the engine if the control function of the valve is damaged.

In this invention, the diesel oxidation catalyst (4) internal volume is preferably only of 5 to 15% of the SCR catalyst internal volume of the SCR system (3) located on the main route (2a). The exhaust pipe section of the secondary route (2b) is preferably 10 to 30% of the one of the main route (2a).

Figure 2:
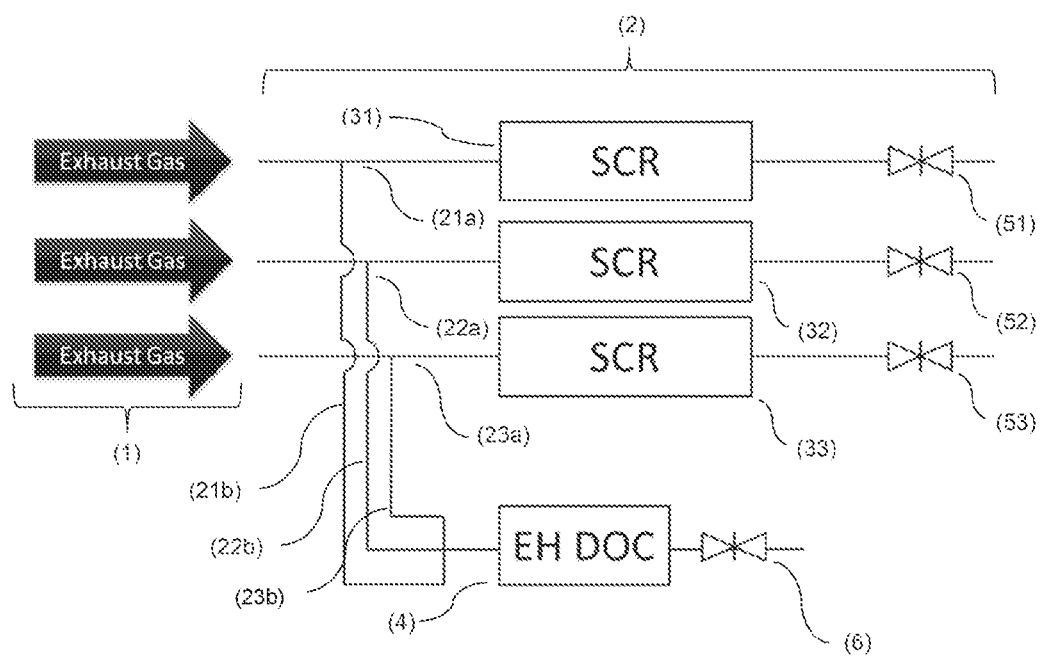
FIG. 2 shows a second embodiment according to the present invention using a plurality of first routes.
Figure 3:
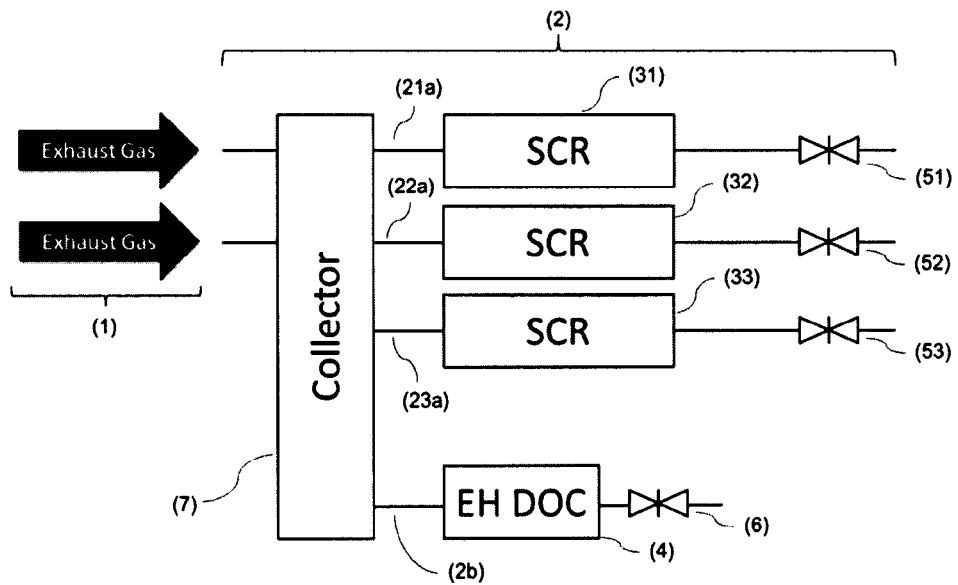
FIG. 3 shows a third embodiment according to the present invention using a plurality of first routes connected upstream to a common exhaust gas manifold.

The invention can be applied to a single exhaust piping as shown on FIG. 1 or on multiple exhaust pipings where the pipings are independent (FIG. 2) or attached to an exhaust collector (FIG. 3).

In FIGS. 2 and 3, the main route (2a) is divided into a plurality of parallel exhaust gas pipings (21a) to (23a) each being provided with a separate SCR catalyst (31) to (33) and a separate valve/flap (51) to (53).

In contrast, there is only a single secondary route (2b) provided with a DOC (4) and a valve/flap (6).

In FIG. 2, the single secondary route (2b) provided with a DOC (4) and a valve/flap (6) is connected via separate pipings (21b) to (23b) to the parallel exhaust gas pipings (21a) to (23a) of the main route (2a).

In FIG. 3, the secondary route (2b) and the parallel exhaust gas pipings (21a) to (23a) of the main route (2a) are connected on a downstream side to an exhaust collector (7).

In FIG. 1, the exhaust bypass, secondary route (2b) can be mounted upstream of a turbocharger 15 and thus the turbocharger 15 may be bypassed when the SCR system (3) is bypassed.

Figure 4:
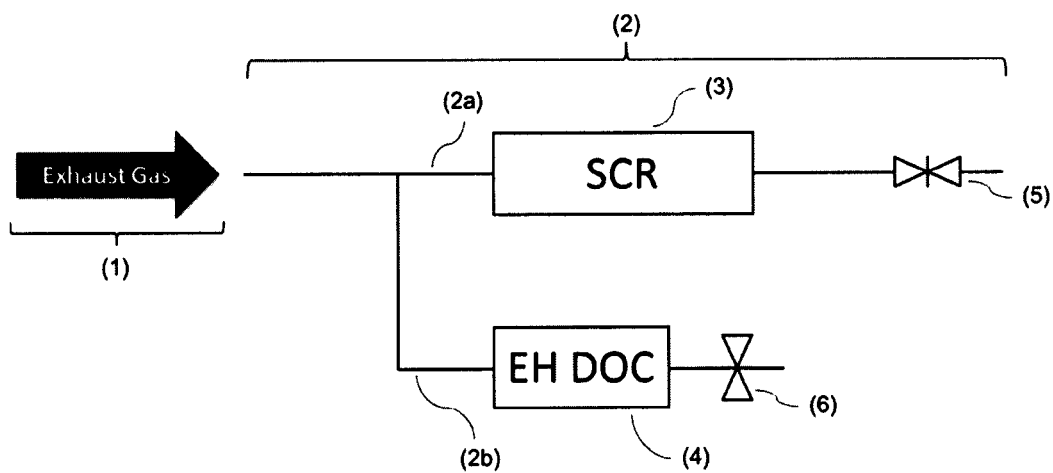
FIG. 4 shows a first operation state of the first embodiment according to the present invention.
Figure 5:
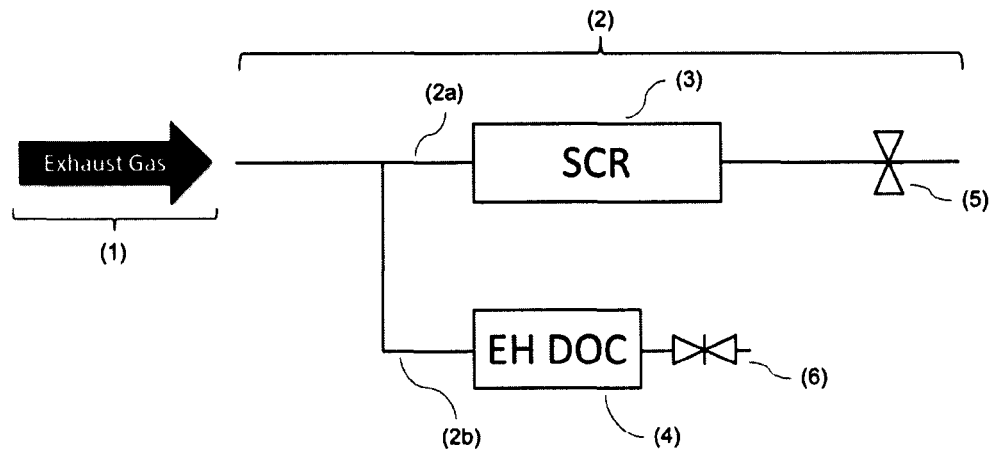
FIG. 5 shows a second operation state of the first embodiment according to the present invention.

The way the exhaust gas aftertreament system (2) is operated by the controller (10) is described by the FIGS. 4 and 5:

At normal operation, described by the FIG. 4, where the temperature allows DEF to be injected in front of the SCR catalyst and the NOx to be reduced, the valve/flap (5) on the main route (2a) is open and the valve/flap (6) on the secondary route (2b) is closed. Here the electrical heater of the diesel oxidation (4) is switched OFF.

At low load and particularly at engine idle, described by the FIG. 5, where the temperature is too low to allow DEF to be injected in front of the SCR catalyst, the valve/flap (5) on the main route (2a) is closed and the valve/flap (6) on the secondary route (2b) is open. Here the electrical heater of the diesel oxidation catalyst (4) is switched ON to reduce the engine emissions such as CO, HC and the particulate matter.

A third possibility would be to use the invention during motoring phases. The valves would be set in the same position than the ones during idle as described by the FIG. 5 but the heater would be switched OFF.

The exhaust has aftertreatment system of the present invention could be used on mobile working machines such as mining trucks.

The mobile working machine may in particular have a trolley system and/or not have a grid box that could be used to increase the engine load at idle. More and more mining trucks are equipped with trolley system and for those trucks, the engine stays at idle when going uphill.

Other applications, especially those using vanadium SCR systems and emitting a large quantity of HC at idle, may equally use the exhaust has aftertreatment system of the invention, especially if they do not have the possibility to increase the exhaust temperature at idle.

Possible applications are mining/construction vehicles, electric generators, ships, etc.

The invention claimed is:
1. An exhaust gas aftertreatment system comprising at least a first route and a second route arranged in parallel in an exhaust gas stream, wherein the first route and the second route are provided with exhaust gas aftertreatment subsystems, wherein
a piping of the first route has a larger sectional area than a piping of the second route,
the exhaust gas aftertreatment subsystems of the first route and the second route use different exhaust gas aftertreatment technologies,
the first route is provided with a SCR catalyst and the second route is provided with a diesel oxidation catalyst, and
the first route is not provided with a diesel oxidation catalyst and the second route is not provided with a SCR catalyst, and
further wherein
the exhaust gas aftertreatment system further comprises a first valve or flap for controlling the exhaust gas stream through the first route, wherein the first valve or flap is arranged downstream of the exhaust gas aftertreatment subsystem of the first route, and
the exhaust gas aftertreatment system further comprises a second valve or flap for controlling the exhaust gas stream through the second route, wherein the second valve or flap is arranged downstream of the exhaust gas aftertreatment subsystem of the second route.

2. The exhaust gas aftertreatment system according to claim 1, wherein a volume of the exhaust gas aftertreatment subsystem of the first route is bigger than a volume of the exhaust gas aftertreatment subsystem of the second route.

3. The exhaust gas aftertreatment system according to claim 2, wherein the volume of the exhaust gas aftertreatment subsystem of the second route is between 5% to 15% of the volume of the exhaust gas aftertreatment subsystem of the first route.

4. The exhaust gas aftertreatment system of claim 1, wherein the first route is provided with at least one out of a first valve and a first flap and the second route is provided with at least one out of a second valve and a second flap, wherein the at least one out of the first valve and the first flap and the at least one out of the second valve and the second flap are each operable to selectively open and close a respective route.

5. The exhaust gas aftertreatment system according to claim 4, wherein the at least one out of the first valve and the first flap is naturally open and wherein the at least one out of the second valve and the second flap is naturally closed.

6. The exhaust gas aftertreatment system according to claim 1, wherein the second route bypasses a turbocharger arranged in the exhaust gas stream.

7. The exhaust gas aftertreatment system according to claim 6, wherein the second route is mounted upstream of the turbocharger.

8. The exhaust gas aftertreatment system according to claim 1, further comprising a plurality of first routes, each provided with an exhaust gas aftertreatment subsystem and arranged in parallel in the exhaust gas stream.

9. The exhaust gas aftertreatment system according to claim 8, wherein the plurality of first routes is combined with a single second route.

10. The exhaust gas aftertreatment system according to claim 1, further comprising a controller to selectively control exhaust gas flow through the first and/or second route, wherein the controller is configured to direct the exhaust gas flow through the first route during a first engine operation condition and to direct the exhaust gas flow through the second route during a second engine operation condition.

11. The exhaust gas aftertreatment system according to claim 10, wherein in the first engine operation condition, at least one out of a load and an exhaust gas temperature of the engine is higher than in the second engine operation condition.

12. The exhaust gas aftertreatment system according to claim 10, wherein the second route is configured to bypass the first route when the controller is configured to direct the exhaust gas flow through the second route during the second engine operation condition.

13. The exhaust gas aftertreatment system according to claim 12, wherein the second engine operation condition includes the engine running at idle.

14. The exhaust gas aftertreatment system according to claim 12, wherein HC emissions are reduced as a result of the bypass.

15. The exhaust gas aftertreatment system according to claim 12, wherein the bypass is used during motoring time to avoid the SCR catalyst cooling.

16. An engine comprising an exhaust gas aftertreatment system according to claim 1.

17. A machine comprising the engine according to claim 16.

18. The machine of claim 17, wherein the machine is a mobile working machine configured to be operated electrically during at least one operation phase, wherein the engine is running in idle mode during the at least one operation phase.

19. The exhaust gas aftertreatment system according to claim 1, wherein the SCR catalyst uses urea injection and wherein the diesel oxidation catalyst is electrically heated.

20. The exhaust gas aftertreatment system according to claim 1, wherein a sectional area of the piping of the second route is between 10% to 30% of a sectional area of the piping of the first route.

21. The exhaust gas aftertreatment system according to claim 1, wherein a volume of the SCR catalyst is bigger than a volume of the diesel oxidation catalyst.

22. The exhaust gas aftertreatment system according to claim 1, wherein a volume of the diesel oxidation catalyst is between 5% to 15% of a volume of the SCR catalyst.

* * * * *